UNITED STATES PATENT OFFICE.

ERNST WALDEMAR JUNGNER, OF KNEIPPBADEN, SWEDEN, ASSIGNOR TO NYA ACKUMULATOR AKTIEBOLAGET JUNGNER, OF STOCKHOLM, SWEDEN.

METHOD OF MAKING ELECTRODES.

No. 880,027.   Specification of Letters Patent.   Patented Feb. 25, 1908.

Application filed April 4, 1907. Serial No. 366,391.

*To all whom it may concern:*

Be it known that I, ERNST WALDEMAR JUNGNER, a subject of the King of Sweden, residing at Kneippbaden, Sweden, have invented certain new and useful Improvements in the Methods of Making Electrodes; and I do hereby declare the following to be a full, clear, and exact description of the invention, such as will enable others skilled in the art to which it appertains to make and use the same.

The present invention relates to a method of increasing the capacity of electro-active, cement-like substances produced from small particles such as grains, powder or flakes of magnetic metals, as iron, nickel and cobalt.

If powder or flakes of a magnetic metal, for example nickel, is stirred to a paste with a suitable electrolyte, such as a sulfuric acid solution of an ammonium salt, and the mixture is pressed to a brick and exposed to air-oxidation, the uppermost layers of the nickel-grains are transformed into nickel sulfate according to the following reaction:

$$Ni + H_2SO_4 = H_2 + NiSO_4$$
$$H_2 + O = H_2O$$

The sulfate of nickel formed combines with the ammonium salt to form the difficultly soluble double salt of nickel and ammonium $(NH_4)_2Ni(SO_4)_2$, which on drying crystallizes on the particles of nickel, connecting them firmly to each other. The oxygen of the air as well as the ammonium salt contribute ultimately to the formation of basic salts, richer in oxygen.

When the above-named reaction, after repeated immersions of the brick in the acidulated solution of the ammonium salt and the subsequent dryings, has continued to a certain point, the brick loses its porosity and sucks up no more solution worth mentioning. It then consists of a conducting skeleton of particles of nickel, the intervening spaces of which are filled with nickel-ammonium salt. The limit of electro-activity that can be given the brick in this way is thus attained. If such a brick is put into a solution of alkali and submitted to anode-electrolysis, the following reactions take place:

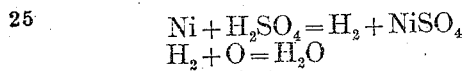
$$2NH_3 + 2H_2O + Ni(OH)_2 + 2K_2SO_4$$

and

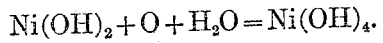

The higher electro-active nickel-hydrate is here for simplicity's sake supposed to be of the above composition. If the brick then be freed from adhering alkaline hydrates by washing with water and thereafter dried, it will be found that it has again become porous so that it can again absorb liquid. The nickel-hydrates thus take up less room than the nickel-ammonium salts previously contained therein. In fact, the pores in the metal skeleton can, after this operation, be filled up with a still greater quantity of electro-active nickel hydrate. It is, however, obvious, that if in the bricks the nickel particles could be wholly or partially replaced by some lighter material, for instance, graphite, the conducting skeleton would, per unit of weight, inclose in its pores a considerably greater quantity of active mass.

The object of my invention is to produce porous conductors, which, uniting great firmness with a good conducting capacity are capable of taking up in their pores the greatest amount possible of active mass per unit of weight, and, further, to fill up these pores to a suitably high degree with electro-active material. An electrode with such a porous conductor and containing a nickel hydrate molecularly adhering to said conductor, may be produced in the following manner: Nickel powder, or thin flakes of nickel metal are mixed with divided, preferably crystalline graphite, of which at least a part has previously been nickel-plated in the galvano plastic way, described in my application for patent of the United States filed September 20, 1904, Serial No. 225,235. The mixture is stirred with a solution of an ammonium-salt to which has been added sulfuric acid, for example salammoniac to a paste, which is kneaded into the meshes of a net-work or into perforated plates of pure nickel or of a nickel alloy, provided with a suitable contact device. The electrode thus formed is dried and thereafter drenched in the same solution, which operations are repeated until the cement has attained sufficient firmness and the pores have been filled with nickel-ammonium salts. The electrode is then put down into an alkali-solution and submitted to anode electrolysis, whereby, according to the before mentioned reactions, the nickel-ammonium salts are replaced by electro-active nickel hydrate.

In order to introduce still more electro-active nickel-hydrate into the pores, the following operation takes place: The electrode is washed with water to remove any adhering alkali-hydrate and is thereafter put into an electrolyte containing a nickel-salt, for instance, sulfate of nickel, which is preferably slightly acidulated (or eventually slightly ammoniacal.)

During the preparation of the anode in alkali the surface of the nickel particles has been completely coated with a thin covering of nickel-hydrate, insoluble in alkali, which, as known, prevents the oxidation of the underlying metal in this electrolyte. The case will, however, be quite different when the anode is put into an electrolyte containing sulfate of nickel, which especially if slightly acidulated, slowly dissolves the coating of nickel-hydrate, so that the metallic nickel surface becomes uncovered. Hereby a galvanic cell of, on the one hand, the high nickel-hydrate, and on the other hand, the metallic nickel is formed, whereby (if the intermediately-formed Ni(OH)$_3$ is eliminated) the following diagrammatical reaction takes place:

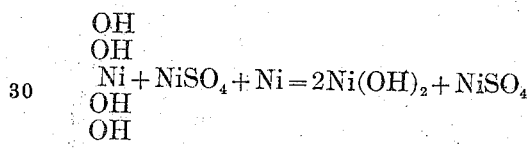

This reaction takes place very slowly, and only after from three to five days has all the hydrate of nickel-peroxid been reduced to Ni(OH)$_2$. The galvanic action is facilitated if non-galvanized graphite is present. To each molecule Ni(OH)$_4$ a molecule of Ni(OH)$_2$ is thus added, whereby the quantity of nickel-hydrate is, as seen, doubled. The addition by degrees has, besides, a strongly adhesive effect on the surrounding particles, whereby the firmness of the cement is still more increased. By anode electrolysis in alkali the lower nickel-hydrate is thereafter transformed to higher, depolarizing hydrates. By repeating these operations the pores of the electrodes are gradually entirely filled with the electro-active hydrate of nickel, and thereby the capacity of the electrodes manifolded. However, the production of new hydrate of nickel takes place by this operation, as will be understood, at the expense of the metallic nickel in the electrode proper. If the reaction is carried too far, the nickel particles forming the conducting skeleton gradually lose their mutual coherence, whereby the conducting capacity of the electrode is decreased.

If in producing the cement a relatively large quantity of flake graphite has been used, whereby the pores have become comparatively large, it is more advantageous, in order to be able to fill them to a suitable degree, to metallically connect the electrode with a smooth nickel-plate, also put into the solution of sulfate of nickel. The nickel plate is also dissolved and the dissolved nickel travels through the electrolyte into the pores of the electrode, where it is deposited in the form of hydrate. In this case it is advantageous not to acidulate the solution of nickel salt, but to keep it perfectly neutral, in order that the nickel particles contained in the cement may be protected as long as possible against oxidation by the layer of hydrate of nickel formed on the surface.

What has been said above about cements of nickel particles with nickel hydrates, is also true of the other metallic metals iron and cobalt and their respective hydrates. An iron electrode may suitably be treated in the following manner:—The electrode is discharged until the greater part of the active mass is oxidized to hydrated peroxid of iron, Fe(OH)$_3$. The electrode is thereafter put into a solution of chlorid of iron and ammonium and is connected with an iron-plate put into the same bath. The following reactions then take place:

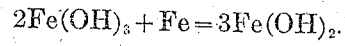

If at the nickel electrode the graphite used be strongly nickel-plated (to 70% or more) such nickel plated graphite may be used alone or else a mixture of strongly nickel-plated and non-plated, or pure graphite used. By means of this method the capacity of cements of the kind described is considerably increased, and this capacity may be charged and discharged in a very short time. Notwithstanding this, the cements preserve perfectly their firmness and conducting power.

What I claim is:

1. The method of producing electroactive substances for secondary batteries which comprises binding small particles of magnetic metal by a hydrate of one of these metals, converting this hydrate to a higher state of oxidation by anode electrolysis in alkali, treating the mass with a solution of a compound of the metal, and subsequently electrolyzing it in an alkaline electrolyte.

2. The method of producing electroactive substances for secondary batteries which comprises binding small particles of magnetic metal by a hydrate of one of these metals, converting this hydrate to a higher state of oxidation treating the mass with a solution of a compound of the metal, while metallically connected to a plate of the same metal and subsequently electrolyzing it in an alkaline electrolyte.

3. The method of producing electroactive substances for secondary batteries which comprises binding small particles of magnetic metal by a hydrate of one of these metals, converting this hydrate to a higher state of oxidation as $Ni(OH)_4$ subsequently converting said higher hydrate to a lower one as $Ni(OH)_2$ and simultaneously forming additional hydrate as $Ni(OH)_2$ and finally converting all the hydrate to a higher state of oxidation as $Ni(OH)_4$, substantially as described.

4. The method of producing electroactive substances for secondary batteries which comprises binding small particles of magnetic metal and graphite with a hydrate of the metal, converting said hydrate to a higher state of oxidation, treating the mass so formed with a solution of a compound of said metal, and finally subjecting the resulting mass to electrolysis in alkali, substantially as described.

5. The method of producing electroactive substances for secondary batteries which comprises binding small particles of magnetic metal and graphite galvano-plated with one of these metals with a hydrate of the metal, converting said hydrate to a higher state of oxidation, treating the mass so formed with a solution of a compound of said metal, and finally subjecting the resulting mass to electrolysis in alkali, substantially as described.

6. The method of producing electroactive substances for secondary batteries which comprises mixing magnetic metal with graphite and graphite coated with one of said metals, binding the mixture with a hydrate of the metal, converting said hydrate to a state of higher oxidation, then subjecting the mixture to the action of a compound of the metal, and finally subjecting the product to electrolysis in alkali, substantially as described.

7. The method of producing electroactive substances for secondary batteries which comprises binding small particles of nickel with its hydrate, converting said hydrate to a higher state of oxidation, then subjecting the same to the action of a solution of a nickel salt and finally subjecting the mass to electrolysis in alkali, substantially as described.

8. The method of producing electroactive substances for secondary batteries which comprises binding small particles of nickel with a nickel hydrate, converting this hydrate to a higher state of oxidation, subjecting the mass to the action of a solution of a nickel salt, containing ammonium, and finally subjecting the mass to electrolysis in alkali, substantially as described.

9. The method of producing electroactive substances for secondary batteries which comprises binding small particles of nickel by a hydrate of nickel, converting this hydrate to a higher state of oxidation, subjecting the mass to the action of a solution of nickel sulfate and salammoniac, and finally subjecting the mass to electrolysis in alkali, substantially as described.

In testimony that I claim the foregoing as my invention, I have signed my name in presence of two subscribing witnesses.

ERNST WALDEMAR JUNGNER.

Witnesses:
SVEN PEHRSSON,
T. BOYE.